United States Patent
Neff et al.

(10) Patent No.: US 10,429,211 B2
(45) Date of Patent: Oct. 1, 2019

(54) APPARATUS AND METHODS FOR LINEAR ACTUATOR WITH PISTON ASSEMBLY HAVING AN INTEGRATED CONTROLLER AND ENCODER

(71) Applicant: Systems, Machines, Automation Components Corporation, Carlsbad, CA (US)

(72) Inventors: Edward A. Neff, Cardiff-by-the-Sea, CA (US); Toan M. Vu, San Diego, CA (US)

(73) Assignee: Systems, Machines, Automation Components Corporation

( * ) Notice: Subject to any disclaimer, the term of this patent is extended or adjusted under 35 U.S.C. 154(b) by 514 days.

(21) Appl. No.: 15/207,380

(22) Filed: Jul. 11, 2016

(65) Prior Publication Data

US 2017/0012519 A1    Jan. 12, 2017

Related U.S. Application Data

(60) Provisional application No. 62/191,237, filed on Jul. 10, 2015.

(51) Int. Cl.
*H02P 7/02* (2016.01)
*G01D 5/347* (2006.01)
(Continued)

(52) U.S. Cl.
CPC ....... *G01D 5/3473* (2013.01); *G01D 5/34753* (2013.01); *H02K 41/031* (2013.01);
(Continued)

(58) Field of Classification Search
CPC .... H02K 7/1869; H02K 7/1876; H02K 41/02; H02K 41/025; H02K 11/22; H02K 11/33
See application file for complete search history.

(56) References Cited

U.S. PATENT DOCUMENTS

| 3,602,749 A | 8/1971 | Esters |
| 4,488,242 A | 12/1984 | Tabata et al. |
| (Continued) | | |

FOREIGN PATENT DOCUMENTS

| DE | 2217958 A1 | 10/1973 |
| EP | 0556469 A1 | 8/1993 |
| (Continued) | | |

OTHER PUBLICATIONS

International Search Report and Written Opinion for International Application No. PCT/US2016/053565, dated Dec. 27, 2016, 8 pages.

(Continued)

*Primary Examiner* — Quyen P Leung
*Assistant Examiner* — Minki Chang
(74) *Attorney, Agent, or Firm* — Cooley LLP (57) ABSTRACT

Disclosed herein are apparatus and methods for linear actuators that can deliver strokes and forces at different values. The linear actuators include both multi-coil and single-coil actuator designs. The linear actuators include a controller that is removably or permanently coupled to a piston assembly having any number of coils. An encoder may also be removably or permanently coupled to the piston assembly. The piston assembly, controller and encoder move as one unit during actuation of the linear actuator.

27 Claims, 5 Drawing Sheets

(51) Int. Cl.
*H02K 41/03* (2006.01)
*H02K 11/22* (2016.01)
*H02K 11/33* (2016.01)

(52) U.S. Cl.
CPC ............. *H02P 7/02* (2016.02); *H02K 11/22* (2016.01); *H02K 11/33* (2016.01)

(56) References Cited

U.S. PATENT DOCUMENTS

| | | | |
|---|---|---|---|
| 4,576,421 A | 3/1986 | Teramachi | |
| 4,616,886 A | 10/1986 | Teramachi | |
| 4,693,676 A | 9/1987 | Inaba | |
| 4,745,589 A | 5/1988 | Nomura | |
| 4,799,803 A | 1/1989 | Tanaka | |
| 4,804,913 A | 2/1989 | Shimizu et al. | |
| 4,808,955 A | 2/1989 | Godkin et al. | |
| 4,857,786 A | 8/1989 | Nihei et al. | |
| 4,858,452 A | 8/1989 | Ibrahim | |
| 5,051,635 A | 9/1991 | Kasahara | |
| 5,053,670 A | 10/1991 | Kosugi | |
| 5,111,088 A | 5/1992 | Fujino | |
| 5,160,865 A | 11/1992 | Gururangan | |
| 5,175,456 A | 12/1992 | Neff et al. | |
| 5,201,838 A * | 4/1993 | Roudaut ............... B25J 13/088 294/206 | |
| 5,225,725 A | 7/1993 | Shiraki et al. | |
| 5,270,625 A | 12/1993 | Neff | |
| 5,317,222 A | 5/1994 | Neff et al. | |
| 5,376,862 A | 12/1994 | Stevens | |
| 5,446,323 A | 8/1995 | Neff et al. | |
| 5,450,050 A | 9/1995 | Ban et al. | |
| 5,476,324 A | 12/1995 | Takei | |
| 5,501,498 A | 3/1996 | Ulrich | |
| 5,594,309 A | 1/1997 | McConnell et al. | |
| 5,685,214 A | 11/1997 | Neff et al. | |
| 5,722,300 A | 3/1998 | Burkhard et al. | |
| 5,751,075 A | 5/1998 | Kwon et al. | |
| 5,834,872 A | 11/1998 | Lamb | |
| 5,859,482 A | 1/1999 | Crowell et al. | |
| 5,893,646 A | 4/1999 | Mizutani et al. | |
| 5,952,589 A | 9/1999 | Leung et al. | |
| 6,043,573 A | 3/2000 | Neff et al. | |
| 6,091,167 A | 7/2000 | Vu et al. | |
| 6,118,360 A | 9/2000 | Neff | |
| 6,223,971 B1 | 5/2001 | Sato | |
| 6,290,308 B1 | 9/2001 | Zitzelsberger | |
| 6,439,103 B1 | 8/2002 | Miller | |
| 6,495,935 B1 | 12/2002 | Mishler | |
| 6,741,151 B1 | 5/2004 | Livshitz et al. | |
| 6,848,164 B2 | 2/2005 | Jung | |
| 6,907,651 B1 | 6/2005 | Fisher et al. | |
| 6,997,077 B2 | 2/2006 | Kollmann et al. | |
| 7,053,583 B1 | 5/2006 | Hazelton | |
| 7,168,748 B2 | 1/2007 | Townsend et al. | |
| 7,323,798 B2 | 1/2008 | Hartramph et al. | |
| 7,482,717 B2 | 1/2009 | Hochhalter et al. | |
| 7,517,721 B2 | 4/2009 | Ito et al. | |
| 8,083,278 B2 | 12/2011 | Yuan | |
| 8,415,838 B1 | 4/2013 | Eghbal et al. | |
| 8,498,741 B2 | 7/2013 | Ihrke et al. | |
| 9,375,848 B2 | 6/2016 | Neff et al. | |
| 9,381,649 B2 | 7/2016 | Neff et al. | |
| 9,731,418 B2 | 8/2017 | Neff et al. | |
| 9,748,823 B2 | 8/2017 | Neff et al. | |
| 9,748,824 B2 | 8/2017 | Neff et al. | |
| 9,887,612 B1 * | 2/2018 | Eghbal ............... H02K 41/0356 | |
| 2003/0009241 A1 | 1/2003 | Kruger et al. | |
| 2003/0218391 A1 | 11/2003 | Hirata | |
| 2004/0076348 A1 | 4/2004 | Dalessandro et al. | |
| 2004/0227535 A1 | 11/2004 | Kobayashi et al. | |
| 2004/0232800 A1 | 11/2004 | Seguchi et al. | |
| 2005/0211512 A1 | 9/2005 | Fenwick | |
| 2005/0234565 A1 | 10/2005 | Marks et al. | |
| 2005/0253469 A1 | 11/2005 | Hochhalter et al. | |
| 2006/0023980 A1 | 2/2006 | Kato et al. | |
| 2006/0113847 A1 | 6/2006 | Randall et al. | |
| 2008/0048505 A1 | 2/2008 | Moriyama et al. | |
| 2008/0150559 A1 | 6/2008 | Nayak et al. | |
| 2008/0157607 A1 | 7/2008 | Scheich et al. | |
| 2008/0258654 A1 | 10/2008 | Neff | |
| 2009/0040247 A1 | 2/2009 | Cato et al. | |
| 2009/0058198 A1 | 3/2009 | Finkbeiner et al. | |
| 2009/0058201 A1 | 3/2009 | Brennvall | |
| 2009/0058581 A1 | 3/2009 | Neff et al. | |
| 2009/0114052 A1 | 5/2009 | Haniya et al. | |
| 2009/0152960 A1 | 6/2009 | Kimura et al. | |
| 2009/0218894 A1 | 9/2009 | Aso et al. | |
| 2009/0261663 A1 | 10/2009 | Aso et al. | |
| 2009/0278412 A1 | 11/2009 | Kimura et al. | |
| 2009/0309442 A1 | 12/2009 | Qu et al. | |
| 2010/0005918 A1 | 1/2010 | Mizuno et al. | |
| 2010/0133924 A1 * | 6/2010 | Neff ............... H02K 41/0356 310/12.02 | |
| 2010/0171378 A1 | 7/2010 | Kim et al. | |
| 2010/0203249 A1 | 8/2010 | Elgimiabi | |
| 2010/0244605 A1 | 9/2010 | Nakano et al. | |
| 2010/0274365 A1 | 10/2010 | Evans et al. | |
| 2011/0068595 A1 | 3/2011 | Ihrke et al. | |
| 2011/0187222 A1 | 8/2011 | Li et al. | |
| 2012/0043832 A1 * | 2/2012 | Neff ............... H02K 41/0356 310/12.14 | |
| 2012/0080960 A1 | 4/2012 | Neff et al. | |
| 2012/0187779 A1 * | 7/2012 | Lee ............... H02K 41/031 310/12.26 | |
| 2012/0206024 A1 | 8/2012 | Yoshida et al. | |
| 2012/0299405 A1 | 11/2012 | Li et al. | |
| 2012/0305092 A1 | 12/2012 | Corso et al. | |
| 2013/0154397 A1 | 6/2013 | Sullivan | |
| 2014/0159407 A1 | 6/2014 | Neff et al. | |
| 2014/0159408 A1 | 6/2014 | Neff et al. | |
| 2014/0159513 A1 | 6/2014 | Neff et al. | |
| 2014/0159514 A1 * | 6/2014 | Neff ............... H02K 41/02 310/12.33 | |
| 2014/0210396 A1 | 7/2014 | Yamanaka et al. | |
| 2014/0317941 A1 | 10/2014 | Patti et al. | |
| 2015/0048695 A1 * | 2/2015 | Stoltenberg ............ H02K 16/00 310/23 | |
| 2015/0168483 A1 | 6/2015 | Kim | |
| 2015/0171723 A1 * | 6/2015 | Neff ............... H02K 41/0356 310/12.18 | |
| 2015/0303785 A1 | 10/2015 | Neff et al. | |
| 2016/0013712 A1 | 1/2016 | Neff et al. | |
| 2016/0184989 A1 | 6/2016 | Neff et al. | |
| 2016/0229064 A1 | 8/2016 | Neff et al. | |
| 2017/0014964 A1 | 1/2017 | Neff | |
| 2017/0089976 A1 | 3/2017 | Neff et al. | |

FOREIGN PATENT DOCUMENTS

| | | |
|---|---|---|
| EP | 1278109 | 1/2003 |
| EP | 1827073 | 8/2007 |
| GB | 645281 A | 10/1950 |
| JP | 61-116964 A2 | 6/1986 |
| JP | 04-181562 | 6/1992 |
| JP | 03-285554 A | 12/1992 |
| JP | 06-260332 | 9/1994 |
| JP | 07-015942 | 1/1995 |
| JP | 07-131967 A | 5/1995 |
| JP | H09-214187 | 8/1997 |
| JP | 2000-152592 A | 5/2000 |
| JP | 2001-238427 A | 8/2001 |
| JP | 2001-286121 A2 | 10/2001 |
| JP | 2002-176294 | 6/2002 |
| JP | 2004-332935 | 11/2004 |
| JP | 2005-020901 A | 1/2005 |
| JP | 2005-080415 | 3/2005 |
| JP | 2008-048556 A | 2/2008 |
| JP | 2008-155302 A2 | 7/2008 |
| JP | 2008-193845 A2 | 8/2008 |
| JP | 2010-178614 A | 8/2010 |
| KR | 10-2008-0090040 | 10/2008 |
| KR | 20-2011-0003488 | 4/2011 |
| KR | 10-2011-0139434 | 12/2011 |

(56) References Cited

FOREIGN PATENT DOCUMENTS

| WO | WO 2007/026566 A1 | 3/2007 |
|---|---|---|
| WO | WO 2007/063729 A1 | 6/2007 |
| WO | WO 2009/116343 A1 | 9/2009 |
| WO | WO 2009/117827 | 10/2009 |
| WO | WO 2011/088964 A1 | 7/2011 |
| WO | WO 2014/076809 | 5/2014 |
| WO | WO 2015/117095 | 8/2015 |
| WO | WO 2015/154026 | 10/2015 |

OTHER PUBLICATIONS

Dirjish, M., "What's the difference between brush DC and brushless DC motors?", Electronic Design, Feb. 16, 2012, 5 pages.
PCT/US2013/047727, International Search Report dated Oct. 16, 2013, 3 pages.
PCT/US2013/047727, Written Opinion dated Oct. 16, 2013, 4 pages.
PCT/US2013/047727, International Preliminary Report on Patentability dated Dec. 31, 2014, 5 pages.
PCT/US2013/047728, International Search Report dated Oct. 16, 2013, 3 pages.
PCT/US2013/047728, Written Opinion dated Oct. 16, 2013, 6 pages.
PCT/US2013/047728, International Preliminary Report on Patentability dated Dec. 31, 2014, 7 pages.
PCT/US2008/071988, International Search Report and Written Opinion dated Nov. 3, 2008, 5 pages.
PCT/US2008/071988, International Preliminary Report on Patentability dated Feb. 2, 2010, 5 pages.
PCT/US2008/052121, International Search Report and Written Opinion dated Aug. 6, 2008, 5 pages.
PCT/US2008/052121, International Preliminary Report on Patentability dated Jul. 28, 2009, 5 pages.
International Search Report and Written Opinion for International Application No. PCT/US2011/053070, dated Feb. 16, 2012, 6 pages.
International Preliminary Report on Patentability International Application No. PCT/US2011/053070, dated Mar. 26, 2013, 5 pages.
Supplementary European Search Report for European Application No. 14191347.5, dated May 4, 2015, 7 pages.
International Search Report and Written Opinion for International Application No. PCT/US2015/014133, dated Apr. 29, 2015, 8 pages.
International Search Report and Written Opinion for International Application No. PCT/US2015/024341, dated Jul. 15, 2015, 10 pages.
International Preliminary Report on Patentability for International Application No. PCT/US2015/024341, dated Oct. 4, 2016, 8 pages.
International Search Report and Written Opinion for International Application No. PCT/US2015/054314, dated Jan. 22, 2016, 10 pages.
International Search Report and Written Opinion for International Application No. PCT/US2016/014602, dated May 12, 2016, 9 pages.
International Search Report and Written Opinion for International Application PCT/US2016/041793, dated Oct. 3, 2016, 7 pages.
Semiconductor Components Industries, LLC, "DC Motor Driver Fundamentals," Publication Order No. TND6041/D, ON Semiconductor [online], Mar. 2014—Rev. 1, pp. 1-9, www.onsemi.com.
Machine Design, Design FAQs, Variable Wattage Control Systems for Electric Heaters, "Moving coil motor technology," [online], Feb. 26, 2009, [Retrieved from the Internet: Jul. 31, 2015], <URL: http://machinedesion.com/motion-control/moving-coil-motor-technology>, 1 page.
Thomas Publishing Company, Product News: Mechanical Power Transmission, "Actuator and Ball Spline come in mini and micro sizes," [online], Sep. 3, 2004, [Retrieved from the Internet: Aug. 7, 2015], <URL: http://news.thomasnet.com/fullstory/455177>, 5 pages.
Luna Bearings, Automation & Power Transmission, WON Linear Motion System, "Compact Ball Spline," [online], 2009, [Retrieved from the Internet: Aug. 7, 2015], <URL: http://www.lunabearings.com/won.htm>, 6 pages.

\* cited by examiner

APPARATUS AND METHODS FOR LINEAR ACTUATOR WITH PISTON ASSEMBLY HAVING AN INTEGRATED CONTROLLER AND ENCODER

CROSS-REFERENCE TO RELATED APPLICATIONS

The present application claims the benefit of priority under 35 U.S.C. § 119(e) of U.S. Provisional Application Ser. No. 62/191,237, entitled CONTROLLER BUILT ONTO PISTON, filed Jul. 10, 2015, the content of which is hereby incorporated by reference in its entirety for all purposes.

FIELD

The invention relates to moving coil actuators and, more particularly, to a linear actuator that includes either a single or multiple coils.

BACKGROUND

Linear actuators are mechanical devices that transform electrical energy into mechanical energy to perform repetitive actions that require linear motion. For example, linear actuators can be used in an assembly plant to place caps on bottles, automatically stamp or label mail, cut glass, place chips on circuits, test various buttons or touch areas on electronic devices, and perform a wide variety of other tasks known in the art.

Some tasks may require one or more linear actuators as illustrated in U.S. Patent Publication No. 2010/0133924 and U.S. Patent Publication No. 2012/0043832, the entireties of which are incorporated by reference herein. Typically, a low cost linear actuator has a single pole and a single 24 or 48 volt DC coil linear motor. Less movement occurs in typical low cost linear actuator designs because there is typically only one coil. Consequently, these designs typically provide a limited stroke distance or value (e.g., maximum stroke of 150 mm).

Long-stoke linear actuators have a magnet housing with multiple magnets and a coil assembly attachable to it. The coil assembly may have any number of coils and the magnet housing may have any number of magnets. The magnet housing can be configured to be coupled to a wide variety of configurations of magnets and coil assemblies to deliver a pre-determined magnetic field. For example, a magnet housing can be manufactured for a 3 coil assembly and a magnet housing can be manufactured for a 6 coil assembly.

Linear actuators may include a number of features (e.g., programmable positioning, speed, or force, and/or the ability to verify that one or more tasks have been successfully completed) which have great utility in automation as well as a wide range of other applications. A controller can be used to receive feedback from sensors and provide signals to the linear actuator to control these features. For example, a linear encoder sensor can send information regarding the current position of a linear actuator piston to the controller and, the controller can send a signal to the linear actuator coil to reposition the linear actuator piston.

A controller can be a single and multi-axis controller for single or multi-axis linear actuators. Controllers can receive feedback from sensors and programming instructions from a user. Controllers can include or be used together with standalone amplifiers and stepper driven drivers. Controllers include a memory and a processor and can be programmed by mnemonic type command instructions via an RS-232 interface into the memory, e.g. NVRAM, that allows code to be stored in non-volatile RAM, which is then used to enable movements to be made by the linear actuator in different modes. Controllers may require no supplementary software.

Controllers are typically mounted in junction boxes or within motor control centers. Cables typically connect the controller to the sensors within the linear actuator. Cables also connect the controller to the coils within the linear actuator housing. For example, a long-stroke linear actuator with having an encoder reader (sensor) typically has 8 wires (A+, A−, B+, B−, I+, I−, 5 volts DC, and a ground) traveling from the linear actuator piston. A three coil design multi-pole, long-stroke linear actuator also has six separate power lines that provide separate voltage/current to each coil set. This makes for a large amount of cabling between the linear actuator and the controller. The setup becomes even more complicated because encoder signal lines are low power and must be isolated and shielded from coil power lines. This means that at least two separate bundles of cables must be used. This setup can be expensive, and is also prone to failure given the number of cables and cable connections. This setup can also result an increased latency between the sensor feedback and actuation of the coil due to the distance between the remotely mounted controller and the linear actuator.

Accordingly, a need exists for methods and apparatus for reducing the cost and the complexity of the cabling between the controller and the linear actuator. A need also exists to reduce the risk of failures and improve the response time between the controller and the linear actuator.

SUMMARY

Methods and apparatus are disclosed herein for reducing the cost and the complexity of traditional cabling between the controller and the linear actuator, thereby improving reliability. In accordance with one aspect of the disclosure, a controller may be removably or permanently coupled to a linear actuator piston assembly. This arrangement reduces the risk of failures and improves the response time between the encoder sensor assembly, the controller, and the linear actuator coils. In accordance with another aspect of the disclosure, a controller and an encoder sensor assembly may be removably or permanently coupled to a linear actuator piston assembly.

The disclosure also pertains to a piston assembly apparatus including a piston shaft, an encoder sensor assembly coupled to the piston shaft, a direct current coil coupled to the piston shaft, and a controller coupled to the piston shaft. The controller is electrically connected to the encoder sensor assembly and the direct current coil. The controller outputs direct current to the direct current coil in order to generate a magnetic field. The controller, the encoder sensor assembly, and the direct current coil move together with a change in position of the piston assembly. The piston assembly can have only one power input.

The controller can also include an amplifier, a driver circuit, a processor, and a memory to store programming. The controller can also include an alternating current to direct current power converter. The controller can be interposed on the piston shaft between one or more additional direct current coils and the direct current coil. The one or more additional direct current coils are electrically coupled to the controller. The controller can individually drive the direct current coil and the one or more additional direct current coils by applying a variable current.

The controller can also include a signaling and programming interface. The encoder sensor assembly can include an encoder sensor read head. The encoder sensor read head can be an optical encoder sensor read head.

In another aspect the disclosure relates to an apparatus including a magnet housing defining an interior volume and including a first end, a second end and a body, the magnet housing further defining a first opening at the first end and a second opening at the second end wherein the first opening and the second opening are in fluid communication with the interior volume, a plurality of magnets coupled to an interior wall of the body, and a piston assembly disposed within the interior volume. The piston assembly includes a piston shaft, an encoder sensor assembly coupled to the piston shaft, a direct current coil coupled to the piston shaft, and a controller coupled to the piston shaft and electrically connected to the encoder sensor assembly and to the direct current coil. The controller can be configured to send and receive data corresponding to a position of the piston assembly and to provide current to the direct current coil so as to generate a magnetic field. The apparatus is a linear actuator.

The controller, the encoder sensor assembly, and the direct current coil may each move together with a change in position of the piston shaft. Advantageously, the magnet housing need not be configured to include an encoder sensor assembly signal output. A linear encoder scale can be coupled to the interior wall of the body. A power connection can be coupled to the magnet housing for supplying power to the controller, and a signaling and programming connection can be coupled to the magnet housing for providing a signal and programming instructions to the controller. The controller can also include an amplifier and a driver circuit. The controller includes a processor and a memory to store programming instructions. The controller can also include an alternating current to direct current power converter. One or more additional direct current coils can be coupled to the piston shaft and can be electrically coupled to the controller. This enables the piston assembly to be configured to include only a single power input. The controller may individually drive the direct current coil and one or more additional direct current coils by applying a variable current.

The encoder sensor assembly can include an encoder sensor read head. The encoder sensor read head can be an optical encoder sensor read head. The controller can also include a signaling and programming communication link.

Another innovative aspect of the subject matter described in this disclosure is implemented in an apparatus comprising a magnet housing defining an interior volume and including a first end, a second end and a body, the magnet housing further defining a first opening at the first end and a second opening at the second end wherein the first opening and the second opening are in fluid communication with the interior volume, a plurality of magnets coupled to an interior wall of the body, and a piston assembly disposed within the interior volume. The piston assembly includes a piston shaft, an encoder sensor assembly coupled to the piston shaft. The encoder sensor assembly includes an optical encoder sensor read head. The piston assembly also includes two or more direct current coils coupled to the piston shaft and a controller attached to the piston shaft. The controller includes a processor, a memory, an amplifier, and a driver circuit connected to at least one of the two or more direct current coils. The controller is communicatively coupled to the encoder sensor assembly and electrically coupled to the two or more direct current coils.

The controller, the encoder sensor assembly, and the direct current coil move together with a change in position of the piston assembly. The controller can include a signaling and programming interface.

The following U.S. published applications are hereby incorporated herein by reference for all purposes:

Application Ser. No. 13/927,075 Application Date Jun. 25, 2013 Publication No. US-2014-0159407-A1 Publication Date Jun. 12, 2014 Title ROBOTIC FINGER Application Ser. No. 13/927,076 Application Date Jun. 13, 2025 Publication NO. US-2014-0159408-A1 Publication Date Jun. 12, 2014 Title ROBOTIC FINGER Application No. PCT/US2013/047727 Application Date Jun. 25, 2013 Publication No. WO 2014/004588 Publication Date Jan. 3, 2014 Title ROBOTIC FINGER Application Ser. No. 13/927,079 Application Date Jun. 25, 2013 Publication No. US-2014-0159514-A1 Publication Date Jun. 12, 2014 Title LOW-COST, REDUCED DIAMETER LINEAR ACTUATOR Application Ser. No. 13/927,078 Application Date Jun. 25, 2013 Publication No. US-2014-0159513-A1 Publication Date Jun. 12, 2014 Title LOW-COST, REDUCED DIAMETER LINEAR ACTUATOR Application No. PCT/US2013/047728 Application Date Jun. 25, 2013 Publication No. WO 2014/004589 Publication Date Jan. 3, 2014 Title LOW-COST, REDUCED DIAMETER LINEAR ACTUATOR Application Ser. No. 12/184,918 Application Date Aug. 1, 2008 Publication No. US 2009-0058581 A1 Publication Date Mar. 5, 2009 Title COMPACT LINEAR ACTUATOR AND METHOD OF MAKING SAME Application No. PCT/US2008/071988 Application Date Aug. 1, 2008 Publication No. WO 2009/018540 Publication Date Feb. 5, 2009 Title COMPACT LINEAR ACTUATOR AND METHOD OF MAKING SAME Application Ser. No. 12/020,466 Application Date Jan. 25, 2008 Publication No. US 2008-0258654 A1 Publication Date Oct. 23, 2008 Title COMBINATION PNEUMATIC AND ELECTRIC LINEAR ACTUATOR Application No. PCT/US2008/052121 Application Date Jan. 25, 2008 Publication No. WO 2008/092124 Publication Date Jul. 31, 2008 Title COMBINATION PNEUMATIC AND ELECTRIC LINEAR ACTUATOR Application Ser. No. 12/188,111 Application Date Aug. 7, 2008 Publication No. US 2009-0040247 A1 Publication Date Feb. 12, 2009 Title MICRO SHIM FOR MOVING COIL ACTUATOR Application Ser. No. 12/622,372 Application Date Nov. 19, 2009 Publication No. US 2010-0133924 A1 Publication Date Jun. 3, 2010 Title COMPACT LINEAR ACTUATOR AND METHOD OF MAKING SAME Application Ser. No. 12/860,809 Application Date Aug. 20, 2010 Publication No. US 2012-0043832 A1 Publication Date Feb. 23, 2012 Title COMPACT LINEAR ACTUATOR WITH ROTARY MECHANISM Application Ser. No. 13/244,156 Application Date Sep. 23, 2011 Publication No. US 2012-0080960 A1 Publication Date Apr. 5, 2012 Title LOW COST MULTI-COIL LINEAR ACTUATOR Application No. PCT/US2011/053070 Application Date Sep. 23, 2011 Publication No. WO 2012/040620 Publication Date Mar. 29, 2012 Title LOW COST MULTI-COIL LINEAR ACTUATOR Application Ser. No. 14/523,418 Application Date Oct. 24, 2014 Publication No. US-2015-0171723-A1 Publication Date Jun. 18, 2015 APPARATUS AND METHODS FOR LOW COST LINEAR ACTUATOR Application Ser. No. 14/611,113 Application Date Jan. 30, 2015 Publication No. US-2015-0303785-A1 Publication Date Oct. 22, 2015 DIRECT DRIVE MOTOR FOR ROBOTIC FINGER Application No. PCT/US2015/014133 Application Date Feb. 2, 2015 Publication No. WO 2015/117095 Publication Date Aug. 6, 2015 DIRECT DRIVE MOTOR FOR ROBOTIC FINGER Application Ser. No. 14/678,717 Application Date Apr. 3, 2015 Publication No. US-2016/0013712-A1 Publication Date Jan. 14, 2016 METHODS AND APPARATUS FOR COMPACT SERIES LINEAR ACTUATORS Application No. PCT/US2015/024341 Application Date Apr. 3, 2015 Publication No. WO 2015/154026 Publication Date Oct. 8, 2015 METHODS AND APPARATUS FOR COMPACT SERIES LINEAR ACTUATORS Application No. PCT/US2015/054314 Application Date Oct. 6, 2015 Publication No. WO 2016/057570 Publication Date Apr. 14, 2016 METHODS AND APPARATUS FOR CLOSED LOOP FORCE CONTROL IN A LINEAR ACTUATOR It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale, in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Following below are more detailed descriptions of various concepts related to, and embodiments of, inventive systems, methods, and apparatus for a linear actuator. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Disclosed herein are embodiments of a linear actuator including a controller and an encoder coupled to a piston assembly. In order to appreciate the advantages and inventive concepts embodied therein, a description of a conventional linear actuator is first made with reference to FIGS. 1-3. As is discussed below with reference to FIG. 4, such conventional linear actuators may be modified in accordance with the teachings herein in order to provide linear actuators configured with the novel piston assembly configurations contemplated by the present disclosure.

Figure 1:
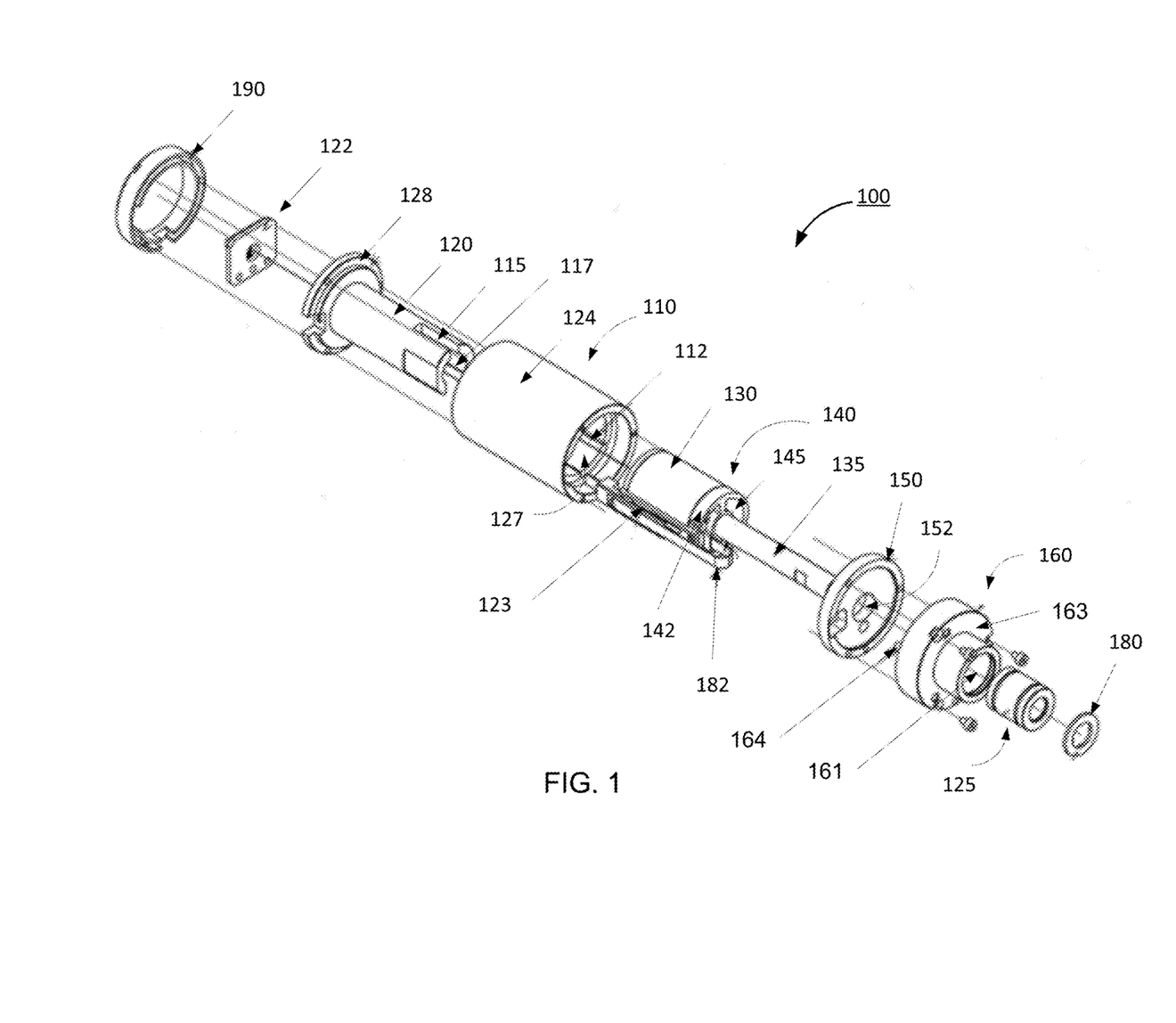
FIG. 1 is an exploded front perspective view of a conventional single-coil linear motor actuator.

FIG. 1 is an exploded front perspective view of a conventional single-coil linear motor actuator. As shown in FIG. 1, a conventional actuator 100 (also referred to herein as "conventional actuator" or "conventional servo-actuator") can include a magnet housing assembly 110 and a conventional piston assembly 140. The magnet housing assembly 110 can include a magnet housing 124, one or more permanent magnets 112, a center pole 120, a printed wiring board or controller 122, a bottom or rear end plate 128, and a top or front end plate 150. The conventional piston assembly 140 can include a coil 130 that is wound around a piston bobbin or housing 142, a piston shaft 135, a flex cable 182, and a linear encoder assembly 123. The conventional actuator 100 also includes a front housing assembly 160, a bushing assembly 125, a lubrication ring 180, and a housing cover 190. Each of these components is discussed in more detail below.

Figure 2:
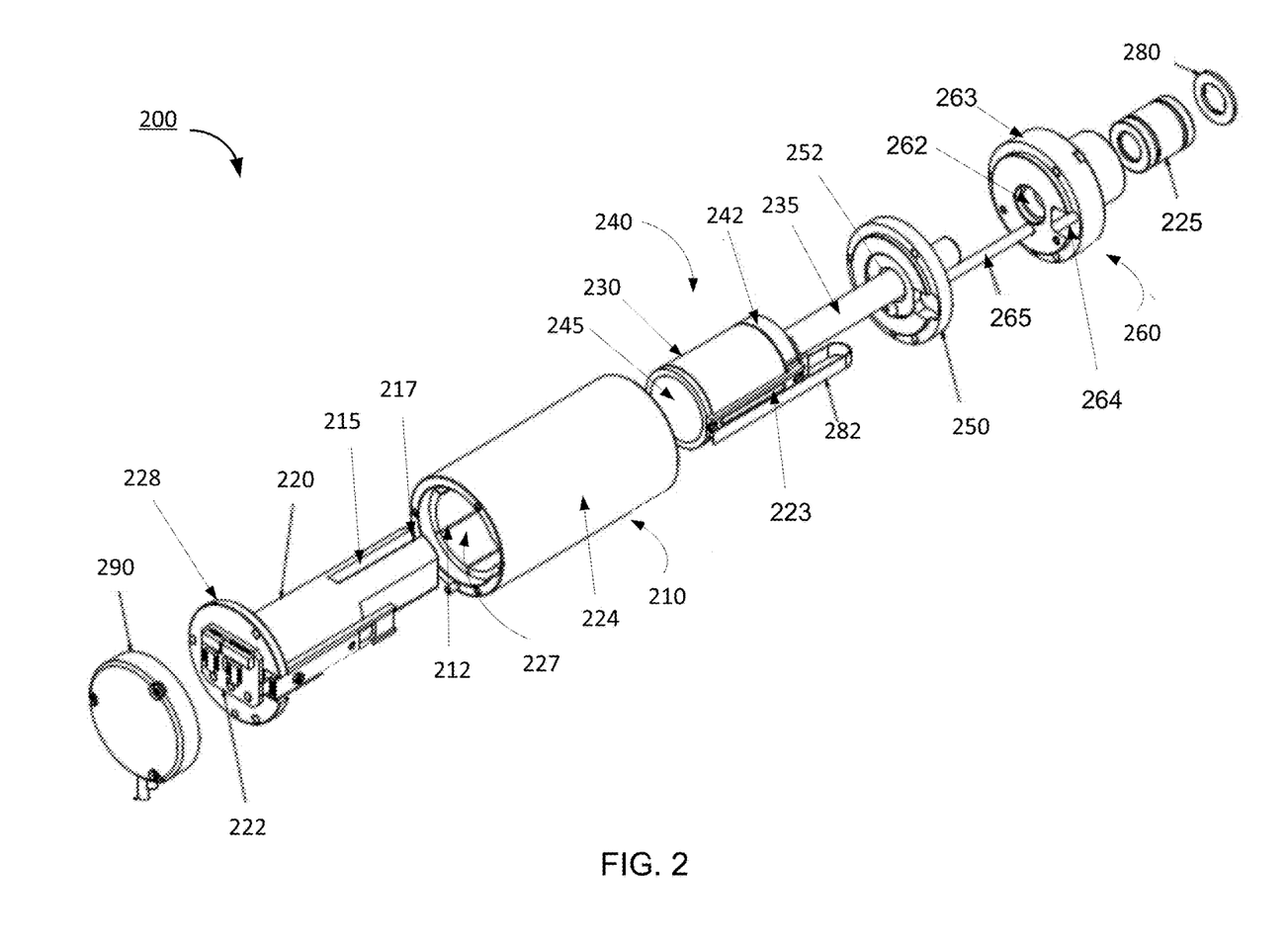
FIG. 2 is an exploded rear perspective view of a conventional single-coil linear motor actuator.

FIG. 2 is an exploded rear perspective view of a conventional single-coil linear motor actuator (also referred to herein as "conventional actuator" or "conventional servo-actuator"). As shown in FIG. 2, a conventional actuator 200 (also referred to herein as "conventional actuator" or "conventional servo-actuator") can include a magnet housing assembly 210 and a conventional piston assembly 240. The magnet housing assembly 210 can include a magnet housing 224, one or more permanent magnets 212, a center pole 220, a printed wiring board or controller 222, a bottom or rear end plate 228 and a top or front end plate 250. The conventional piston assembly 240 can include a coil 230 that is wound around a piston housing or bobbin 242, a piston shaft 235, a flex cable 282 and a linear encoder assembly 223. The conventional actuator 200 also includes a front housing assembly 260, a bushing assembly 225, a lubrication ring 280, and a housing cover 290. Each of these components is discussed in more detail below.

The conventional actuators 100 and 200 can include the same or similar functions and some or all of the same or similar components. Thus, details about the conventional actuator 100 and the conventional actuator 200 are described together in the following paragraphs.

Referring to FIGS. 1 and 2, the bobbin or piston housing 142 (242) of the conventional piston assembly 140 (240) can support an electrically conductive medium such as, for example, the coil 130 (230). The bobbin 142 (242) can define an interior region 145 (245). During operation of the conventional linear actuator 100 (200), current is introduced through the coil 130 (230) thereby creating a magnetic field having a direction that depends on the direction that the current is flowing through the coil 130 (230). The magnitude of the magnetic field corresponds to the number of turns associated with each coil 130 (230) and the amperage conducted through the conductive material. For example, a coil 130 (230) can include 74 turns per coil, but it should be understood that any number of turns per coil may be used. The coil 130 (230) may have, for example, a resistance of approximately 1.7 ohms, 6.8 ohms per phase, and can be fabricated with a 29 gauge copper wire. Such specifications are only exemplary. It should be understood that any type of conductive material with varying specifications can be used. It should further be understood that the coils may be electrically connected to a power source and/or connected together in any manner known in the electrical and mechanical arts. The bobbin 142 (242) can be formed with a low cost, plastic material to reduce the overall mass of the conventional piston assembly 140 (240).

As described above, the conventional piston assembly 140 (240) also includes the piston shaft 135 (235) that is coupled to the piston bobbin 142 (242). A portion of the piston shaft 135 (235) extends within the interior region of the bobbin 142 (242). The piston shaft 135 (235) can be formed with, for example, a metal, such as, steel. The shaft 135 (235) and the bobbin 142 (242) may be formed as a single unitary piece. The conventional piston assembly 140 (240) also includes the flex cable 182 (282) and linear encoder assembly 123 (223) that are each coupled to the bobbin 142 (242). The function of the linear encoder assembly 123 (223) and flex cable 182 (282) are described in more detail below with reference to FIGS. 3A and 3B.

As described above, the magnet housing assembly 110 (210) may include one or more magnets 112 (212). The magnets can be, for example, permanent magnets and can be, for example, substantially cylindrical magnets or circular magnet segments, which may be coupled to an interior wall of the magnet housing 124 (224). For example, the magnets 112 (212) can be coupled to the magnet housing 110 (210) during manufacturing with various adhesives or screws. The magnets 112 (212) can be adapted to magnetically interface with the conventional piston assembly 140 (240) when a magnetic field is present. Hence, by repeatedly alternating the direction that current is flowing through the coil 130 (230) of the conventional piston assembly 140 (240), a linear force may be repeatedly imparted upon the conventional piston assembly 140 (240).

The center pole 120 (220) shown in FIGS. 1 and 2 defines an interior lumen 115 (215) and an opening 117 (217) at a first end of the center pole 120 (220). The center pole 120 (220) is received within an interior volume 127 (227) defined by the magnet housing 124 (224). As shown in FIGS. 1 and 2, the rear end plate 128 (228) is coupled to a second end of the center pole 120 (220) and the printed wiring board or controller 122 (222) can be coupled to the rear end plate 128 (228) (printed wiring board or controller 122 is shown uncoupled from the rear end plate 128 in FIG. 1). The housing cover 190 (290) can be coupled to the second end of the magnet housing 124 (224) and enclose the printed wiring board or controller 122 (222) and rear end plate 128 (228).

The interior volume 127 (227) of the magnet housing 124 (224) can have an interior diameter sized to help ensure a tight relationship of the magnet housing 124 (224) to other components of the conventional actuator 100 (200). The center pole 120 (220) includes an outer diameter sized to be received within the interior volume 127 (227) of the magnet housing assembly 110 (210) such that the center pole 120 or 220 can be substantially centered within the magnet housing 124 (224) within a desired tolerance (for example, within a range of +1-20 microns). The outside and inside diameters of the center pole 120 or 220 may be within an appropriate range (for example, within a range of +1-40 microns) for optimal functioning of the conventional actuator 100 or 200.

The front end plate 150 (250) defines an opening 152 (252) and can be coupled to the first end of the magnet housing 124 (224). The opening 152 (252) can receive an end portion of the piston shaft 135 (235) during operation of the conventional actuator 100 (200) as described in more detail below. The front end plate 150 (250) can also be formed with a magnetic material such that when the front end plate 150 (250) is coupled to the magnet housing 124 (224) the magnetic circuit generated within the magnet assembly 110 (210) can be balanced such that the forces applied through a stroke of the conventional piston assembly 140 (240) can be substantially uniform or the same for a set current.

As shown in FIGS. 1 and 2, the front housing assembly 160 (260) can define a front bore 161 (not shown in FIG. 2), a rear bore 262 (not shown in FIG. 1), a piston shaft housing 163 (263), an anti-rotation lock pin 164 (264), a dowel 265 (not shown in FIG. 1), and a linear bearing or bushing assembly 125 (225). The piston shaft housing 163 (263) can receive at least a portion of the piston shaft 135 (235) and a spline bearing (not shown in FIG. 1 or 2). The piston shaft 135 (235) can include splines (series of grooves or ridges) along a portion of its length. The piston shaft housing 163 (263) can be used to lock the piston shaft 135 (235) by locating one or more grooves (or ridges) of the spline in the piston shaft 135 (235) in a pre-determined orientation. For example, the piston shaft housing 163 (263) can be used to lock the piston shaft 135 (235) in an orientation that is parallel to a surface of a linear encoder scale (not shown in FIGS. 1 and 2) within, for example, 20 microns (the linear encoder scale is described in more detail below with reference to FIG. 3B). Additionally, the anti-rotation lock pin 164 (264) can also engage and extend through the moving conventional piston assembly 140 (240) and can prevent or limit the rotation of the piston shaft 135 (235). Thus, by maintaining the position of the piston shaft 135 (235), the linear encoder scale (see 231 in FIG. 3B) and linear encoder sensing circuitry (see 232 in FIG. 3B) can be maintained in alignment. This can also help maintain the flex cable 182 (282) in a linear or straight orientation, and can help maintain the bobbin 142 (242) attached to the piston shaft 135 (235) in a coaxial configuration.

The linear bearing or bushing assembly 125 (225) can be, for example, a linear bushing by IKO Inc. (LM81517). It should be understood, however, that other structures/guide assemblies may alternatively be used. Additionally, the lubrication ring 180 (280) can be coupled to the bushing assembly 125 (225) and can provide continuous or substantially continuous lubrication to the piston shaft 135 (235) and the spline bearing (not shown in FIGS. 1 and 2). This can result in a significantly longer useful life of the conventional actuator 100 (or 200). For example, the conventional actuator 100 (200) can exceed, for example, up to 100 million cycles. This is a significant improvement over the typical life of unlubricated actuators that operate, for example, in approximately the range of 15-20 million cycles.

During operation of the conventional actuator 100 (200), the conventional piston assembly 140 (240) can move relative to magnet housing 124 (224) and be received within the interior volume 127 (227) of the magnet housing 124 (224). The conventional piston assembly 140 (240) moves in a reciprocating manner along the outer surface of the center pole 120 (220), which as described above is disposed within the interior volume 127 (227) of the magnet housing 124 (224). The interior lumen 115 (215) of the center pole 120 (220) allows the piston shaft 135 (235) to be received therein and prevent or limit possible impact with the rear end plate 128 (228) and/or center pole 120 (220) during operation at high cycle rates (e.g., greater than 2 Hz). Thus, the conventional piston assembly 140 (240) can move freely up and down the center pole 120 (220) during operation of the conventional actuator 100 (200) with the piston shaft 135 (235) able to be moved in and out of the interior lumen 127 (227) of the center pole 120 (220). In addition, the opening in the front end plate 152 (252) can allow at least a portion of the piston shaft 135 (235) to pass therethrough and prevent impact with the top end plate 150 (250) during operation at high cycle rates (e.g., greater than 2 Hz).

Figure 3A:
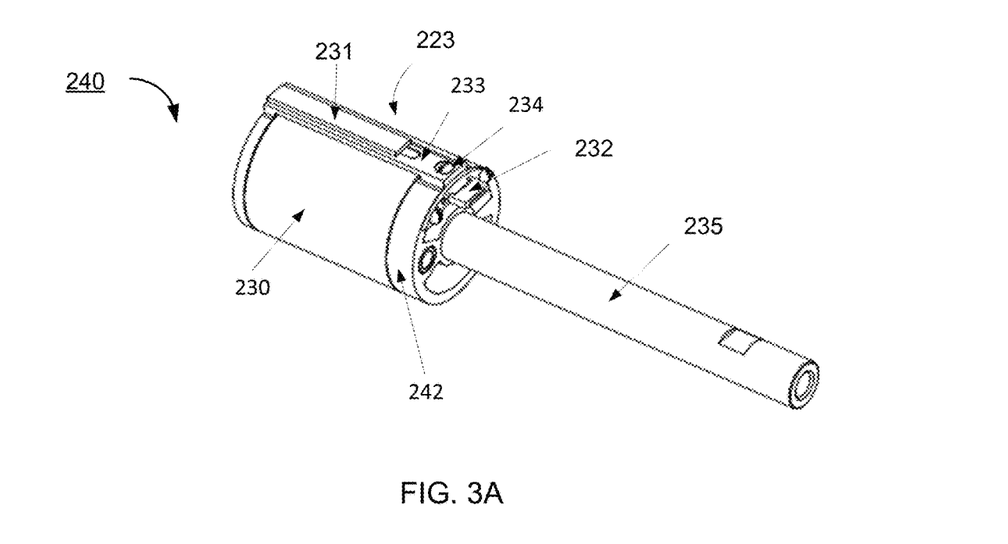
FIG. 3A is a perspective view of a conventional piston assembly.
Figure 3B:
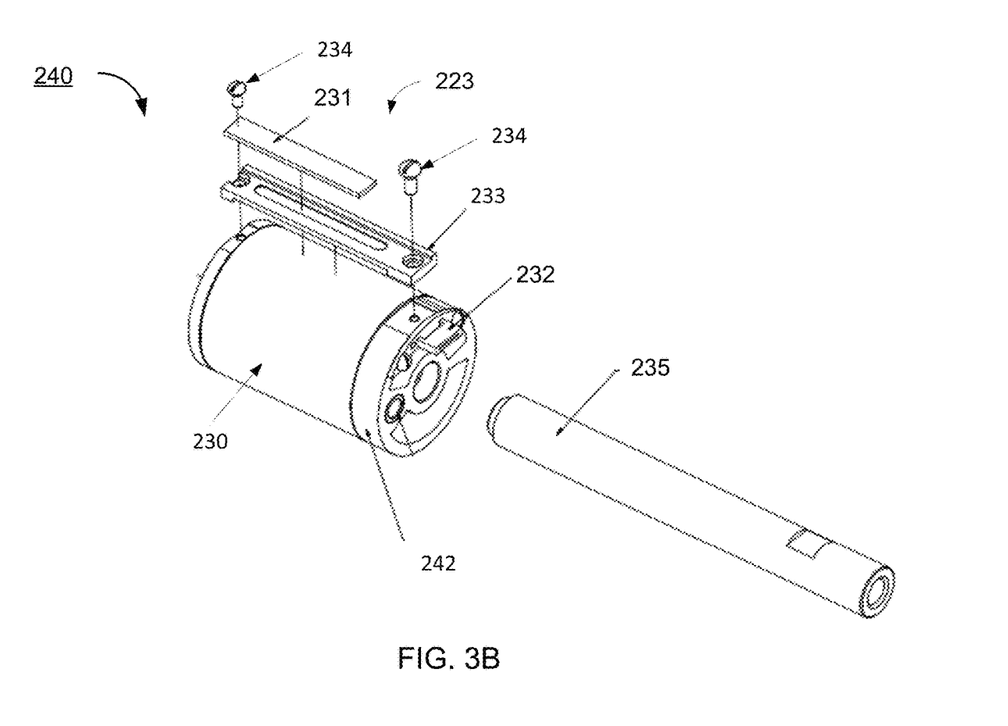
FIG. 3B is an exploded perspective view of the conventional piston assembly of FIG. 3A.

FIG. 3A is a perspective view of the conventional piston assembly 240 and FIG. 3B is an exploded perspective view of the conventional piston assembly 240. The conventional piston assembly 140 can include the same or similar components and the same or similar functions as the conventional piston assembly 240 and is therefore not described in detail below. As described above, the conventional piston assembly 240 can include a linear encoder assembly 223. The linear encoder assembly 223 can include feedback circuitry (not shown) and a linear scale 231 for indicating linear positional feedback to, for example, a controller (such as a remote computer). The linear encoder assembly 223 may include an encoder housing 233 that can be coupled to the conventional piston assembly 240 using, for example, a threaded fastener, such as, for example, screws 234, as shown in FIGS. 3A and 3B. The linear encoder assembly 223 can thus remain fixed with respect to the conventional piston assembly 240 as the conventional piston assembly 240 is repeatedly actuated. The encoder housing 233 can be disposed within, for example, a cutout (not shown in FIGS. 3A and 3B) defined by the piston housing or bobbin 242. The linear encoder assembly 223 can also include a sensor, transducer or read head (each not shown in FIG. 2, 3A or 3B), which can be paired with the linear scale 231 that can encode position. The encoder sensor can be contained, for example, within a printed circuit board 232 and can read the linear scale 231 in order to convert the encoded position into an analog or digital signal. This in turn can then be decoded into position data by a digital readout (DRO) or motion controller (not shown in FIGS. 1 and 2). The linear encoder assembly 223 can work in either incremental or absolute modes. Motion can be determined, for example, by change in position over time. Linear encoder technologies can include, for example, optical, magnetic, inductive, capacitive and eddy current. Optical linear encoders can dominate the high resolution market and can employ shuttering/Moiré, diffraction or holographic principles. Typical incremental scale periods can vary from hundreds down to sub-micrometer, and following interpolation can provide resolutions as fine as a nanometer.

Although not shown in FIGS. 3A and 3B, the linear encoder scale 231 may include a series of stripes or markings running along a length of the linear encoder scale 231. When the conventional piston assembly 240 is actuated, the linear encoder sensor read head 232 (e.g., an optical reader) can count the number of stripes or markings read in order to determine the current linear position of the conventional piston assembly 240 (e.g., a position of the bobbin 242 and/or piston shaft 235). Recorded positional data may then be transmitted to a remote device for monitoring purposes. A user can input one or more values to a remote device (such as a connected computer) in order to designate an amount of linear movement desired for a particular task. These values can then be transmitted to a controller (not shown in FIGS. 1, 2, 3A, and 3B) in electrical communication with the linear encoder assembly 223 such that linear movement of the conventional piston assembly 240 can be adjusted according to the values specified.

Stroke variation and linear encoder resolution may be adjusted by the user, thereby reducing costs associated with reconfiguring and/or replacing the conventional actuator 100 (200). In addition, the conventional actuator 100 (200) may also include a number of programmable modes for adjusting, for example, position, force and speed of the conventional piston assembly 140 (240) during operation. Additionally, linear encoder feedback can be matched with position, enabling the verification of work done by checking the position of the conventional piston assembly 140 (240) (e.g., a position of the bobbin 142 (242) or piston shaft 135 (235)) during the stroke of the conventional actuator 100 (200). The stroke can be, for example, a function of various assemblies of the conventional actuator 100 (200) (e.g., the magnet housing assembly 110 (or 210), the conventional piston assembly 140, (240) and/or the front housing assembly 160 (260)).

A replaceable magnet housing assembly 110 (210) may be used to increase the length of the stroke, yet without requiring replacement of more expensive components that are serviceable in all stroke variations (e.g., the conventional piston assembly 140 (240)). For example, the magnet housing assembly 110 (210) may be replaced with a more elongated magnet housing assembly 110 (210), thereby enabling a longer actuator stroke. A slot can be provided between the coil 130 (230) and the front of the conventional piston assembly 140 (240) that is long enough to cover a stroke of a specified maximum range, and thus the conventional piston assembly 140 (240) may be serviceable to cover various different stroke variations. The front housing assembly 160 (260) may also be designed to be long enough to cover various different stroke variations. In this manner, when the length of the stroke of the conventional actuator 100 or 200 requires modification, fewer components may need to be replaced. Such a design may also serve to reduce the number and/or variety of parts required to be stocked as well as expedite delivery of actuator components.

While FIG. 1 and FIG. 2 each depict a conventional single-coil actuator 100, 200, these conventional actuators can include a conventional piston assembly 140 (240) that includes multiple coils 130 (230) supported by separate bobbins 142 (242) of the same conventional piston assembly 140 (240), and a magnet housing assembly 110 (210) containing a series of alternately magnetized magnets (e.g., NS, SN, NS, etc.). The magnet housing assembly 110 (210) and conventional piston assembly 140 (240) for such a multi-pole configuration can be implemented using standard machining processes. The conventional piston assembly 140 (240) may include any number of coils 130 (230) to meet the particular output parameters of the conventional actuator. For example, to achieve a smaller stroke for a conventional linear actuator 100 (200), it may be desirable to use only one coil 130 (230). Because coils 130 (230) can be expensive, using only one can save overall costs. With only one coil 130

(230), however, there may be less force at a set stroke value. Thus, conventional linear actuators having more than one coil 130 (230) may be desired for tasks requiring higher stroke values. A conventional single-coil actuator can offer simple control like a brush motor for strokes up to, for example, 25 mm. A conventional multi-coil actuator, on the other hand, can offer larger stroke capabilities such as, for example, of up to 100 mm or more.

As discussed above, all or a portion of the manufactured parts can be machined on a CNC lathe such as the Hardinge model RS51MSY or other lathe that has the ability to machine one or both ends of a component (e.g., via sub-spindle transfer). Each part can be made in a single operation on the lathe, thereby reducing and/or eliminating the need for secondary operations. These secondary operations can present additional costs and may also reduce quality by increasing dimensional variation. The components of the conventional actuator 100 may be manufactured from aluminum or steel. It should be understood, however that other suitable materials may be used.

The conventional actuators 100, 200 described herein can be manufactured and assembled quickly and cost effectively. Further, the conventional actuators 100, 200 may be manufactured to be relatively small, lightweight, and compact. Optionally, an optical linear encoder assembly can provide monitoring and control over up to 100% of movement affected by the conventional actuators 100, 200. Further, the individual designs of the front housing assembly 160, 260, the magnet housing assembly 110, 210, and the conventional piston assembly 140, 240 provide flexibility and easy re-configurability during manufacturing such that various actuator configurations can be produced to conform to the specifications of a particular project.

However, these conventional actuators have several deficiencies compared to the actuators having a controller and encoder integrated into the piston assembly, according to the present embodiments. Each direct current coil of a conventional actuator requires a set of power wires connecting the each of the direct current coils to the controller, and a set of encoder sensor read head signal wires connecting the encoder to the controller. Because of potential interference, power wires and cabling is separated from signal wires and cabling. Because the conventional piston assembly moves repeatedly during actuation of the conventional actuator, and the controller is affixed either inside or outside the magnet housing, a flex cable having slack accommodates the extreme positions due to the movement of the conventional piston assembly. Each power wire connection and each signal wire connection is a potential point of failure. By reducing the number of power wire connections and signal wire connections between the piston assembly and magnet housing, reliability of the linear actuator is greatly improved. By reducing the number of power wires and signal wires, the size of the flex cable can be reduced.

Figure 4A:
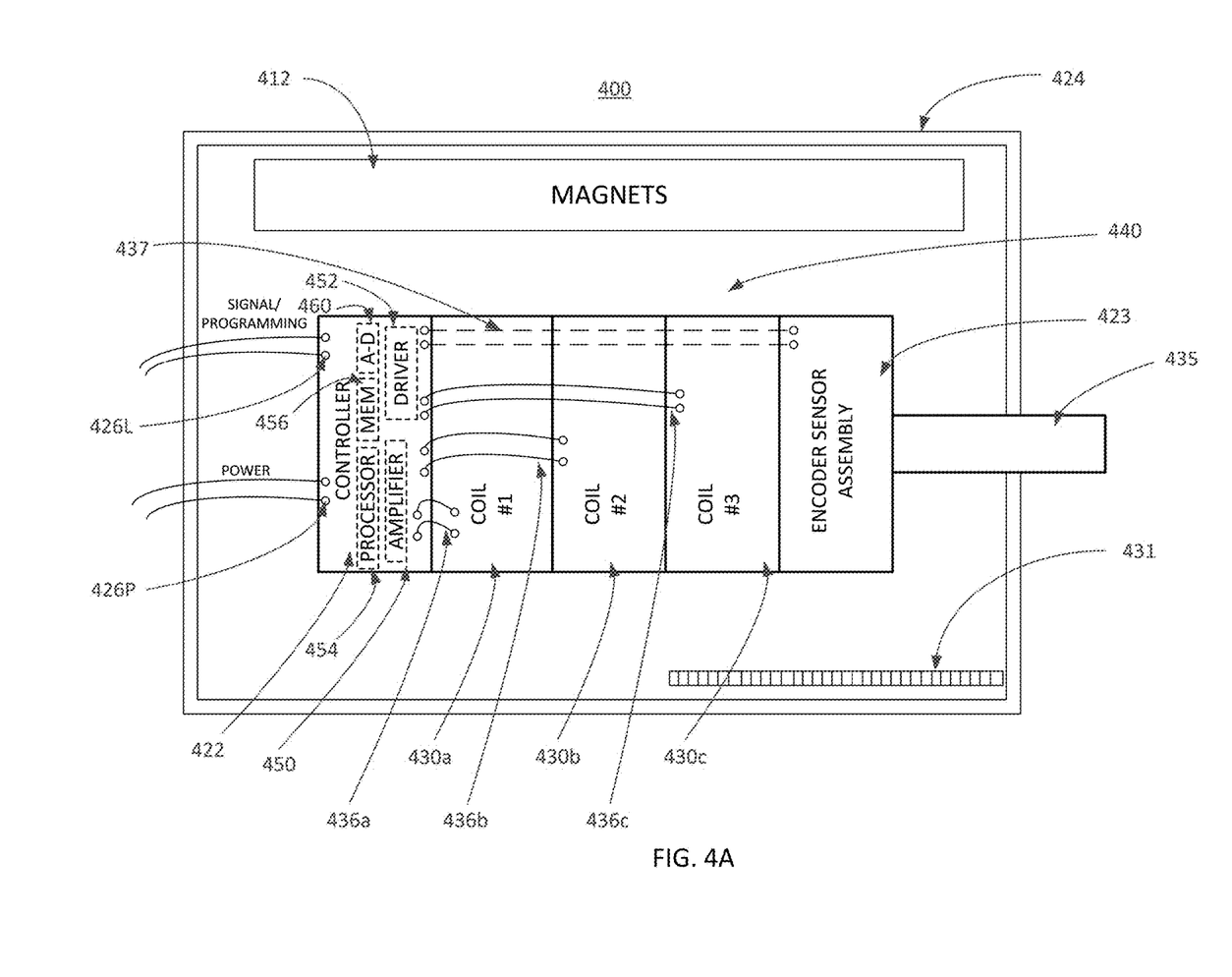
FIGS. 4A and 4B show exemplary embodiments of a linear actuator including an controller and an encoder coupled to a piston assembly.
Figure 4B:
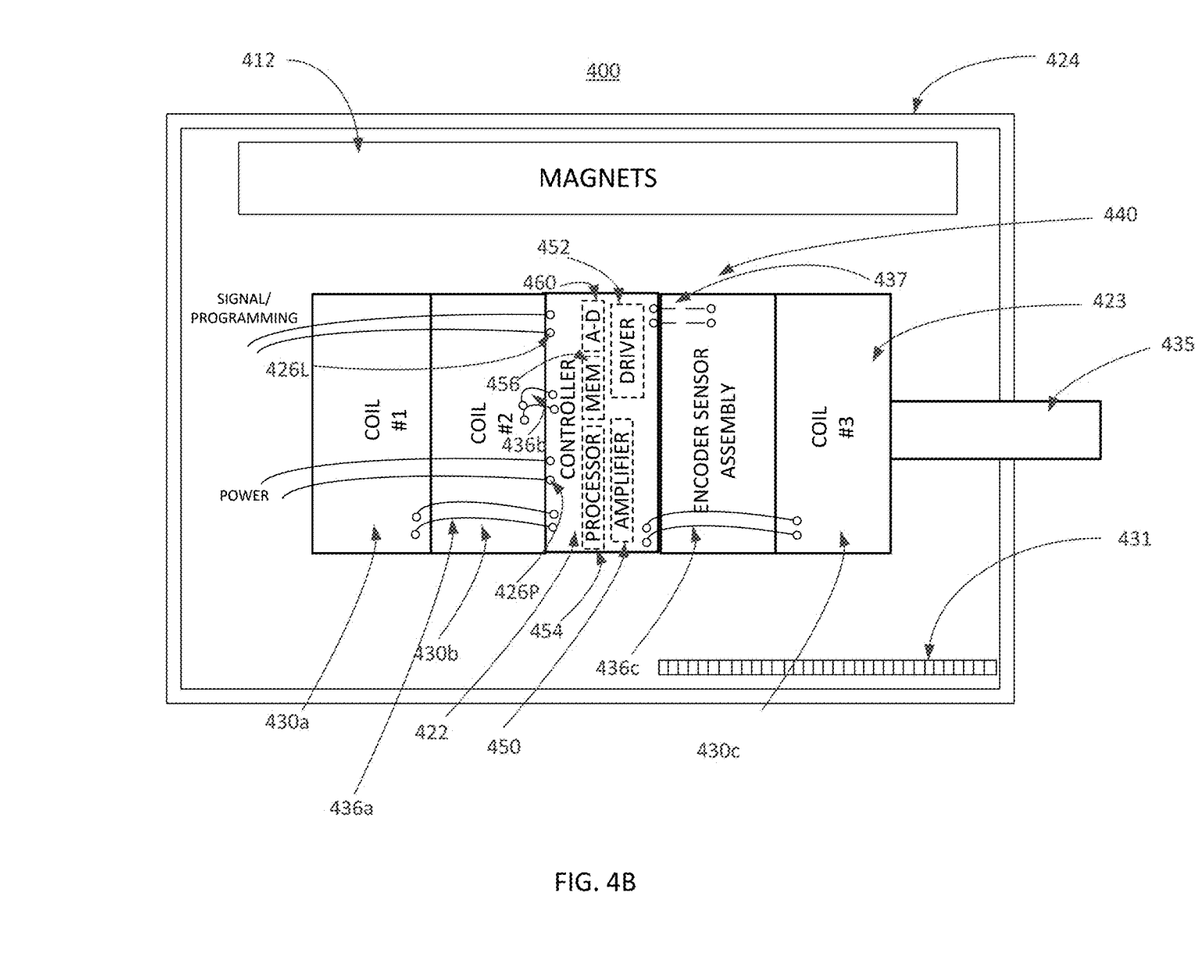

Attention is now directed to FIGS. 4A and 4B, which show exemplary embodiments of a linear actuator including a piston assembly 440 having a controller 422 and an encoder sensor assembly 423 including an encoder sensor read head. Since the controller 422 and encoder sensor assembly 423 including encoder sensor read head may be integrated or built into the piston assembly 440, external wires or connections outside the housing are not necessary to connect these devices together. The magnetic housing 424 provides protection for the piston assembly 440 including the controller 422 and the encoder sensor assembly 423 including encoder sensor read head, and also protects the wiring therebetween. The encoder signal wires 437 running from the encoder sensor assembly 423 to the controller 422 can be shielded from interference including interference from the coil power wires 436a-c that connect coils 430a-c to controller 422.

As shown by FIGS. 4A and 4B, the piston assembly 440 of the linear motor actuator 400 includes a controller 422, an encoder sensor assembly 423, direct current (DC) coils #1, #2, and #3 (430a-c), and a piston shaft 435. The encoder sensor assembly 423 includes an encoder sensor read head that can read the position of the piston assembly 440 relative to the magnet housing 424. The magnet housing 424 contains a linear encoder scale 431 with graduations or increments at precise intervals for determining the relative position of the piston assembly. The piston assembly 440 position can be mapped to the linear encoder scale 431, which can be read by an optical linear encoder sensor read head within the encoder sensor assembly 423 in order to determine the current location of and/or how far the piston assembly 440 has moved. In doing so, the current location of the piston assembly 440 and/or other positional information may be provided as feedback to the electronic controller 422. The linear encoder scale 431 can be securely fastened to the magnet housing 424 or integrated into the magnet housing 424 during manufacture. The linear motor actuator 400 can also contain a rotary encoder (not shown) for measuring rotational position of the piston assembly 440 and/or piston shaft 435.

Each coil 430a-c of the piston assembly 440 is connected to the controller 422. Though depicted as a linear actuator 440 having three coils, any number of coils can be used within the linear actuator 440. In one embodiment, two or more coils are coupled to the piston assembly. Coils can be added to increase the length of the piston stroke and/or the force applied by the piston shaft 435. The controller 422 is capable of driving each coil 430a-c individually.

The controller 422 can include a built-in amplifier 450 and driver 452. The controller 422 includes a processor 454 and a memory 456 to store programming or computer code. The controller 422 further includes an input to receive signals from the encoder sensor assembly 423, as well as a signaling and programming communications link 426L for sending and receiving programming instructions and signals. The controller 422 also includes an input for power 426P, which is typically DC power, though in some embodiments, the controller 422 can include circuitry 460 to convert alternating current (AC) input power to DC power. The controller 422 includes power outputs that send power via coil power wires 436a-c to each of the coils 430a-c included within the piston assembly 440. By incorporating the controller 422 onto/into the piston assembly 440, only on set of power wires are necessary to power the entire piston assembly 440 including the controller 422, the coils 430a-c, and the encoder sensor assembly 423. Suitable controllers include the CBC miniature controller available from SMAC Corp., Carlsbad, Calif.

While depicted in FIG. 4A as having a certain arrangement of controller, coils, and encoder sensor assembly, it should be appreciated that any arrangement of the controller, the coils, and the encoder sensor assembly are contemplated. For example, in other embodiments, such as in the embodiment of FIG. 4B, the controller and encoder sensor assembly are positioned proximate to one another, with the coils positioned at either or both sides of the controller and encoder sensor assembly. Positioning the controller on the piston assembly at the center point of the linear actuator stroke can reduce the length of the flex cable that connects the controller to the magnet housing.

In one embodiment, the piston assembly includes a piston shaft, an encoder sensor assembly coupled to the piston shaft, a direct current coil coupled to the piston shaft, and a controller coupled to the piston shaft. The encoder sensor assembly includes an encoder sensor read head. The controller is communicatively coupled to the encoder sensor assembly and is configured to send and to receive data corresponding to a position of the piston assembly. The controller is also electrically coupled to the direct current coil and is configured to cause the direct current coil to generate a magnetic field. The magnetic field of the direct current coil repels against or attracts toward the magnetic field generated by the magnets attached to the magnet housing to actuate the piston assembly. The controller, the encoder sensor assembly, and the direct current coil each move together with a change in position of the piston assembly.

In some embodiments, the piston assembly includes only one power input. Because the controller may be configured to include one or more driver circuits to power the coils, in some embodiments only the controller receives external power via a power input. During operation the controller may drive each coil individually to move the linear actuator. Because the signals from the encoder sensor read head may be weak, the controller can also have an amplifier or amplifier circuit for strengthening the encoder sensor signal.

In one embodiment, the linear actuator comprises a magnet housing including a first end, a second end and a body defining an interior volume between the first end and the second end and inside the body, the magnet housing further defining a first opening at the first end and a second opening at the second end wherein the first opening and the second opening are in fluid communication with the interior volume. The magnet housing further includes a plurality of magnets coupled to an interior wall of the body. The plurality of magnets can be permanent magnets, or more specifically rare earth permanent magnets. The magnet housing further includes a power connection coupled to the magnet housing for supplying power to the controller. More specifically, the power connection may be coupled to the first or second end of the magnet housing. Along with the power connection, a signaling and programming connection is coupled to the magnet housing for proving a signal and programming instructions to the controller.

A piston assembly is disposed within the interior volume of the body of the magnet housing. The piston assembly includes a piston shaft, an encoder sensor assembly, a direct current coil, and a controller, each coupled to the piston shaft. The controller is communicatively coupled to the encoder sensor assembly and receives signals from the encoder sensor read head. The controller is also electrically coupled to the direct current coil to provide power to the direct current coil.

In one embodiment, the linear actuator is a linear actuator having a piston assembly that has only one power input. In one embodiment, the linear actuator is a multi-coil linear actuator having a piston assembly that has only one power input. The single power input provides power to the controller which in turn provides power to the multiple coils and to the encoder sensor assembly.

Because the controller is typically disposed on the piston assembly, it is unnecessary to provide an encoder sensor assembly signal from the piston assembly to a controller external to the linear actuator or an internal cavity defined thereby. Thus, in one embodiment a magnet housing of the linear actuator need not be configured with an interface through which an encoder sensor assembly signal could be externally provided. In other words, the magnet housing need not accommodate communication of a signal from the encoder sensor read head to an external controller. In each of these embodiments, a controller may provide positional information of the piston assembly from a signaling and programming communications link. The signaling and programming communications link receives programming instructions that are stored into a memory of the controller. The signaling and programming communications link of the controller also receives signals from an external source that causes the controller to position the piston assembly.

In one embodiment, the linear actuator comprises a magnet housing including a first end, a second end and a body defining an interior volume between the first end and the second end and inside the body, the magnet housing further defining a first opening at the first end and a second opening at the second end wherein the first opening and the second opening are in fluid communication with the interior volume. The magnet housing includes a plurality of magnets coupled to an interior wall of the body and a piston assembly disposed within the interior volume of the magnet housing. The piston assembly includes a piston shaft and an encoder sensor assembly coupled to the piston shaft. The encoder sensor assembly includes an optical encoder sensor read head. The piston assembly also includes two or more direct current coils coupled to the piston shaft and a controller. The controller includes a processor, a memory, an amplifier, a driver circuit, a signaling and programming communication link. The controller is communicatively coupled to the encoder sensor assembly and electrically coupled to the two or more direct current coils. The piston assembly has one power input attached to the controller. The controller, the encoder sensor assembly, and the direct current coil move together with a change in position of the piston assembly.

In one embodiment, a method of using an exemplary linear actuator includes providing power to a piston assembly of a linear actuator through a single set of power wires. The piston assembly includes a controller attached to a piston shaft and configured to receive the power provided through the single set of power wires. The method also includes providing programming instructions to the controller via a programming and signaling communications link. After programming the controller, including calibrating the encoder sensor assembly, the method includes providing a signal to the controller via the programming and signaling communications link. The method further includes actuating the linear actuator by driving a coil attached the shaft of the piston assembly. The coil is driven by the controller outputting direct current to the coil to generate a magnetic field.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, FORTRAN, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The articles "a," "an," and "the," as used herein in the specification and in the claims, unless clearly indicated to the contrary, should be understood to mean "at least one." Thus, for example, the term "a coil" is intended to mean a single coil or multiple coils.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A piston assembly apparatus, comprising:
a piston shaft;
an encoder sensor assembly coupled to the piston shaft;
a direct current coil coupled to the piston shaft; and
a controller coupled to the piston shaft and electrically connected to the encoder sensor assembly and the direct current coil wherein the controller outputs direct current to the direct current coil in order to generate a magnetic field wherein the controller, the encoder sensor assembly, and the direct current coil move together with a change in position of the piston assembly apparatus.

2. The apparatus of claim 1, wherein the piston assembly has only one power input.

3. The apparatus of claim 1, wherein the controller further comprises an amplifier and a driver circuit.

4. The apparatus of claim 1, wherein the controller further comprises a processor and a memory to store programming.

5. The apparatus of claim 1, wherein the controller further comprises an alternating current to direct current power converter.

6. The apparatus of claim 1, further comprising:
one or more additional direct current coils coupled to the piston shaft and electrically coupled to the controller.

7. The apparatus of claim 6, wherein the piston assembly has only one power input.

8. The apparatus of claim 6, wherein the controller individually drives the direct current coil and the one or more additional direct current coils by applying a variable current.

9. The apparatus of claim 1, wherein the controller further comprises a signaling and programming interface.

10. The apparatus of claim 1, wherein the encoder sensor assembly further comprises an encoder sensor read head.

11. The apparatus of claim 10, wherein the encoder sensor read head is an optical encoder sensor read head.

12. A piston assembly apparatus, comprising:
a piston shaft;
an encoder sensor assembly coupled to the piston shaft;
a direct current coil coupled to the piston shaft;
a controller coupled to the piston shaft and electrically connected to the encoder sensor assembly and the direct current coil wherein the controller outputs direct current to the direct current coil in order to generate a magnetic field and wherein the controller is interposed on the piston shaft between the one or more additional direct current coils and the direct current coil; and
one or more additional direct current coils coupled to the piston shaft and electrically coupled to the controller.

13. An apparatus, comprising:
a magnet housing defining an interior volume and including a first end, a second end and a body, the magnet housing further defining a first opening at the first end and a second opening at the second end wherein the first opening and the second opening are in fluid communication with the interior volume;
a plurality of magnets coupled to an interior wall of the body; and
a piston assembly disposed within the interior volume, the piston assembly including:
A) a piston shaft;
B) an encoder sensor assembly coupled to the piston shaft;
C) a direct current coil coupled to the piston shaft; and
D) a controller coupled to the piston shaft and electrically connected to the encoder sensor assembly and to the direct current coil wherein the controller, the encoder sensor assembly, and the direct current coil each move together with a change in position of the piston shaft.

14. The apparatus of claim 13, wherein the controller is configured to send and receive data corresponding to a position of the piston assembly and to provide current to the direct current coil so as to generate a magnetic field.

15. The apparatus of claim 13, wherein the magnet housing has no encoder sensor assembly signal output.

16. The apparatus of claim 13, further comprising:
a linear encoder scale coupled to the interior wall of the body.

17. The apparatus of claim 13, wherein the controller further comprises an amplifier and a driver circuit.

18. The apparatus of claim 13, wherein the controller further comprises a processor and a memory to store programming instructions.

19. The apparatus of claim 13, wherein the controller further comprises an alternating current to direct current power converter.

20. The apparatus of claim 13, further comprising:
one or more additional direct current coils coupled to the piston shaft and electrically coupled to the controller.

21. The apparatus of claim 20, wherein the piston assembly has only one power input.

22. The apparatus of claim 20, wherein the controller individually drives the direct current coil and one or more additional direct current coils by applying a variable current.

23. The apparatus of claim 13, wherein the encoder sensor assembly comprises an encoder sensor read head.

24. The apparatus of claim 23, wherein the encoder sensor read head is an optical encoder sensor read head.

25. The apparatus of claim 13, wherein the controller further comprises a signaling and programming communication link.

26. An apparatus, comprising:
a magnet housing defining an interior volume and including a first end, a second end and a body, the magnet housing further defining a first opening at the first end and a second opening at the second end wherein the first opening and the second opening are in fluid communication with the interior volume;
a plurality of magnets coupled to an interior wall of the body; and
a piston assembly disposed within the interior volume, the piston assembly including:
A) a piston shaft;
B) an encoder sensor assembly coupled to the piston shaft, the encoder sensor assembly including an optical encoder sensor read head;

C) two or more direct current coils coupled to the piston shaft; and

D) a controller attached to the piston shaft, the controller including a processor, a memory, an amplifier, and a driver circuit connected to at least one of the two or more direct current coils, the controller being communicatively coupled to the encoder sensor assembly and electrically coupled to the two or more direct current coils wherein the controller, the encoder sensor assembly, and the direct current coils move together with a change in position of the piston assembly.

27. The apparatus of claim 26 wherein the controller includes a signaling and programming interface.

* * * * *